United States Patent [19]

Tang

[11] 3,854,755
[45] Dec. 17, 1974

[54] COLLAPSIBLE BICYCLE

[76] Inventor: Thomas L. C. Tang, 254 Gorwin Dr., Holliston, Mass. 01496

[22] Filed: Apr. 20, 1973

[21] Appl. No.: 352,952

[52] U.S. Cl. ............................... 280/278, 280/287
[51] Int. Cl. ............................................ B62k 13/00
[58] Field of Search ........................... 280/287, 278

[56] References Cited
UNITED STATES PATENTS

| 3,195,923 | 7/1965 | Moulton | 280/287 |
| 3,374,009 | 3/1968 | Jeunet | 280/287 |
| 3,608,917 | 9/1971 | Cogliano | 280/278 |

FOREIGN PATENTS OR APPLICATIONS

| 286,246 | 12/1961 | Netherlands | 280/287 |

Primary Examiner—Robert R. Song
Attorney, Agent, or Firm—John E. Toupal

[57] ABSTRACT

Disclosed is a collapsible bicycle comprising a rear power module, an operator control module and a front wheel module. The operator's seat, the front brake and the steering mechanism are mounted on the operator control module and thus the spacial relationships thereamong remain in adjustment in the collapsed or assembled state of the bicycle. All the modules are approximately the size of the bicycle wheels. An auxiliary seat module and an auxiliary power module can be combined with the three aforementioned modules to form a collapsible tandem bicycle.

22 Claims, 9 Drawing Figures

PATENTED DEC 17 1974
3,854,755
SHEET 3 OF 4
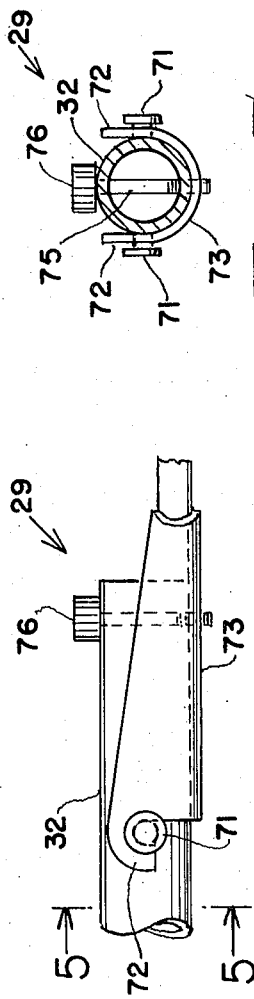
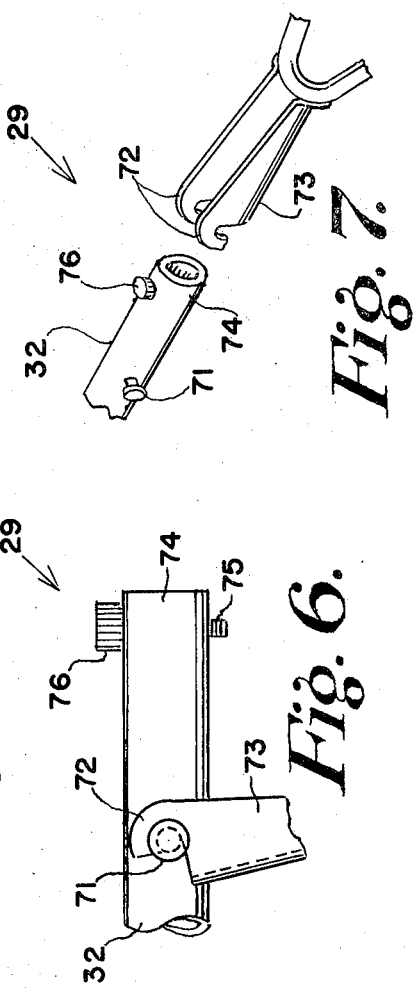
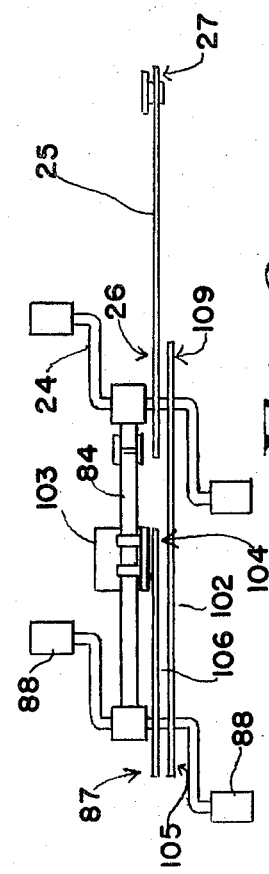
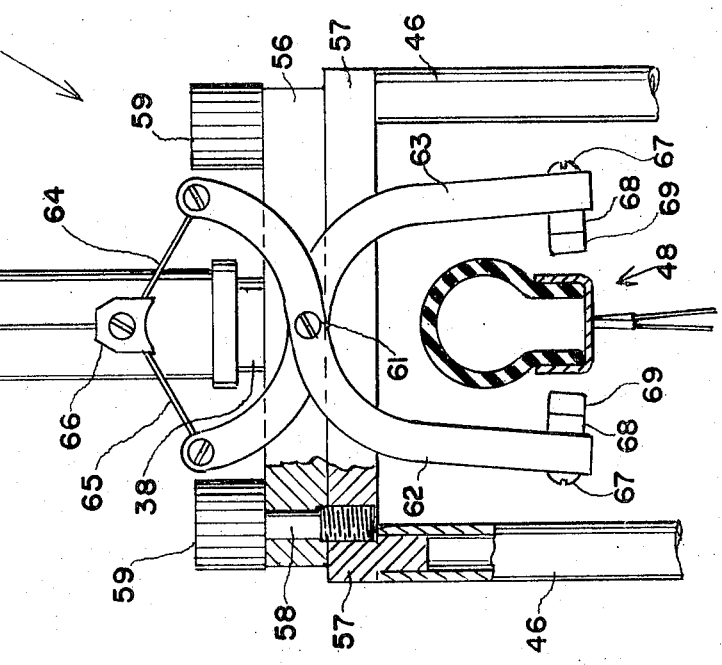

COLLAPSIBLE BICYCLE

BACKGROUND OF THE INVENTION

This invention relates to bicycles and, more particularly, to collapsible bicycles that can be assembled as conventional one rider vehicles or as tandem bicycles.

Collapsible bicycles are known but problems have existed with prior models that have adversely affected their acceptance. For example, often disassembly and reassembly was difficult or required special tools so that owners were hesitant to disassemble and thus the collapsible feature was not utilized by all owners. Furthermore, adjustments, such as the position of the seat, had to be made following reassembly. In some prior models the smallest components to which the bicycle could be reduced were so large that storage was still a problem. Such was the case, for example, when the handlebars remained affixed to the front wheel.

In some prior collapsible bicycles provision was made for conversion to tandem bicycles. Often this was a difficult procedure. Particularly difficult was the problem of coupling the power from a second set of pedals to the rear wheel. For example, if a chain were used, fine adjustments were required to insure that it functioned properly without falling from the sprockets.

The object of this invention, therefore, is to provide a collapsible bicycle comprised of conveniently sized components which can be assembled and disassembled without the use of tools. It is a further object that the apparatus be easily convertible into a tandem bicycle.

SUMMARY OF THE INVENTION

This inventon is characterized by a collapsible bicycle formed of a rear power module that includes a rear wheel with pedals connected thereto, an operator control module with a seat and steering apparatus thereon and a front wheel module with a front wheel. The rear power module and the operator control module are detachably coupled by a power coupling apparatus and the front wheel module is detachably coupled to the operator control module by a front wheel coupling that also couples the front wheel to the steering system. When the bicycle is collapsed, each of the modules is approximately the same size as the bicycle wheels. Thus the collapsed bicycle requires a minimum of storage space. The coupling apparatus requires no tools during collapsing or assembly. Consequently, a bicycle is provided that can quickly and easily be collapsed for storage and quickly assembled for use. Mounting the steering apparatus, including the handlebars, on the same module as the seat insures that the spacial relationship between the seat and the handlebars remains in adjustment following collapsing and assembly. Thus assembly is further simplified.

A feature of the invention is the inclusion of a coaster brake on the rear power module and the inclusion of a front wheel brake on the operator control module. Inasmuch as each brake is mounted on only one module, the brakes remain in adjustment during collapsing and subsequent assembly. Thus, assembly is yet further simplified and the apparatus is rendered substantially safer because should the brakes require readjustment each time the bicycle is collapsed and assembled some owners may neglect that operation.

Another feature of this invention is the provision of an auxiliary seat module with an auxiliary seat and an auxiliary power module with auxiliary pedals and a power coupling system, all of which can be added to the three aforementioned modules to form a tandem bicycle. The power coupling system includes a chain that couples power from the auxiliary pedals to the rear wheels. The auxiliary seat module includes hinge pins for providing flexible coupling between the rear power module and the auxiliary seat module. As the coupling is flexed, sprockets supporting the chain move closer together and thus the chain can be quickly and easily mounted and dismounted. When the coupling is moved to an operating position, the chain is taut and in adjustment. A blocking apparatus prevents flexure of the coupling beyond the operating position. Consequently, the bicycle can be converted into a tandem bicycle quickly and easily and power coupling from the auxiliary pedals to the rear wheel is readily provided.

Still another feature of the invention is the inclusion of an auxiliary set of handlebars on the auxiliary seat module that is coupled thereto by a hinge. The hinge permits the handlebars to move between an operating position and a storage position. Consequently, a more compact apparatus that requires less storage space is provided by moving the handlebars to their storage position.

DESCRIPTION OF THE DRAWINGS

These and other features and objects of the present invention will become more apparent upon a perusal of the following description taken in conjunction with the accompanying drawings wherein:

FIG. 3 is a detail view of the front wheel coupling and front brake utilized in the embodiment shown in FIG. 1;

FIGS. 4–7 are detailed views of the rear coupling utilized in the bicycle shown in FIG. 1;

FIG. 9 is a view of the power coupling chain apparatus utilized in the embodiment shown in FIG. 8.

DESCRIPTION OF THE PREFERRED EMBODIMENTS

Figure 1:
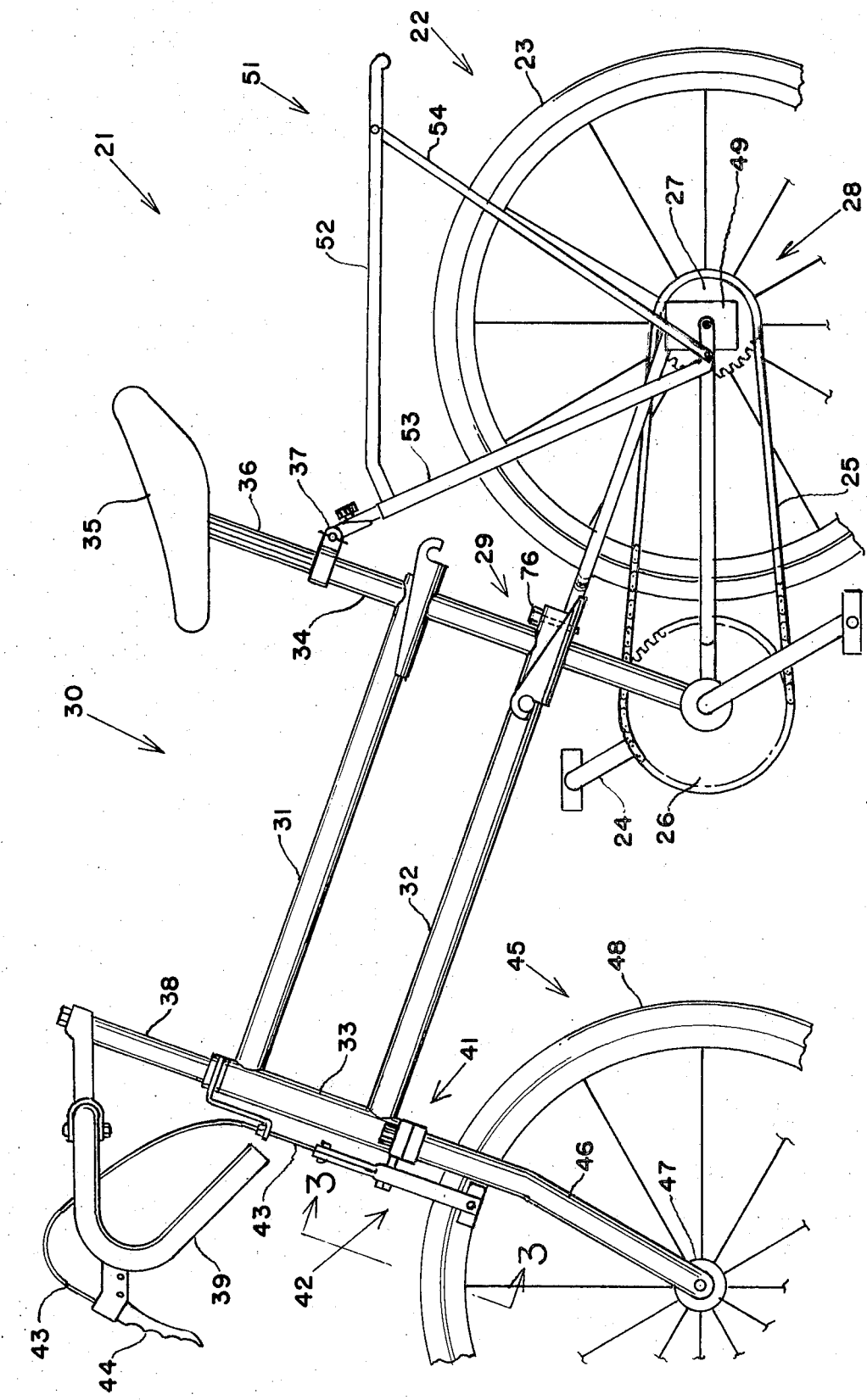
FIG. 1 shows a preferred collapsible bicycle.
Figure 2:
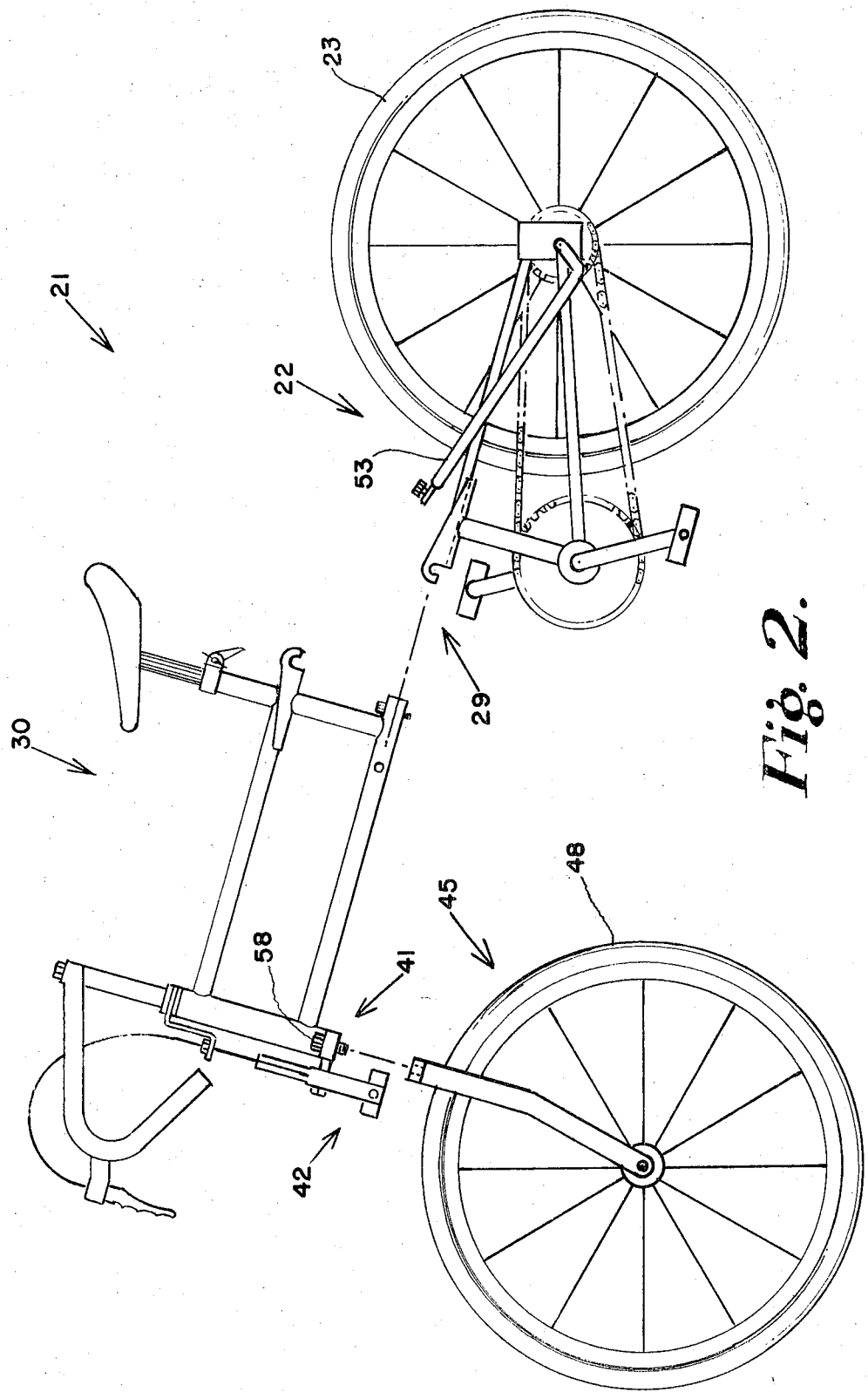
FIG. 2 is an exploded view of the bicycle depicted in FIG. 1 in which the separable components can be discerned more easily.

Referring first to FIGS. 1 and 2 there is shown a collapsible bicycle 21 including a rear power module 22 with a rear wheel 23 and pedals 24 coupled thereto by a chain 25. The chain 25 spans from a pedal sprocket 26 to a rear axle sprocket 27. Included at the rear axle is a coaster brake 28. A power module coupling joint 29 couples the rear power module 22 to an operator control module 30 formed of two substantially parallel bars 31 and 32 with two substantially parallel pillars 33 and 34 affixed to the ends thereof. The joint 29 will be described in greater detail below. At the top of the pillar 34 is a seat 35 on a tubular adjustment extension 36. The height of the seat 35 is adjustable as the telescopic extension 36 is moved within the pillar 34. The seat 35 is retained at any desired position by a seat adjustment clamp 37. Passing through the pillar 33 is a steering shaft 38 that is rotatable within the pillar 33 and couples handlebars 39 to a front wheel joint 41 to be described in greater detail below. A front brake 42 on the front wheel joint 41 is coupled by a brake cable 43 to a front brake control 44. In a front wheel module 45, a front wheel fork 46 extends from the joint 41 to an axle 47 of a front wheel 48.

Coupled to a rear axle plate 49 in the rear power module 22 is a luggage carrier 51 including a platform 52 and two support members 53 and 54. The support members 53 and 54 are each only one of a pair of members, however, the mating member is hidden in FIGS. 1 and 2. The platform 52 is coupled to the member 53, which is detachably coupled to the clamp 37. When released from the clamp 37 the luggage carrier 51 can rotate 180° about the joint between the supports 53 and the plate 49. When such a rotation is performed, the platform 52 rests on the ground below the rear wheel 23 and the rack 51 functions as a service stand. The platform 52 is optional in the bicycle 21. Preferably, the member 53 is included even if the platform 52 is not.

As is seen most clearly in FIG. 2 with the joints 29 and 41 released, the three modules 22, 30 and 45 are approximately the size of the wheels 23 and 48, which are each the same size.

Referring now to FIG. 3 there is shown a detail frontal elevation view of the front wheel coupling 41. The pillar 33 is rigidly coupled to the bars 31 and 32 and the shaft 38 is rotatable within tbe pillar 33 in response to movement of the handlebars 39. Affixed to the lower end of te shaft 38 is a coupling block 56. The front wheel fork 46 terminates in a block 57 that is situated adjacent the block 56 and held in place by mounting screws 58. As shown, the heads 59 of the screws 58 are large and knurled and thus the blocks 56 and 57 can be pulled tightly together or loosened by hand.

A pivot pin 61 extending from the block 56 pivotally retains two brake arms 62 and 63. The upper ends of the arms 62 and 63 are coupled by cables 64 and 65, respectively, to a junction block 66 and thence to the cable 43. Adjustment screws 67 passing through slots in the lower ends of the arms 62 and 63 adjustably couple blocks 68 thereto. The blocks 68 support rubber brake pads 69. The screws 67 are utilized to adjust the brakes 42 so that the pads 69 are adjacent the metal rim of the wheel 48. When the cable 43 is drawn in an upward direction the upper ends of the arms 62 and 63 are drawn together and thus the lower ends also come together. Consequently, the wheel 48 is squeezed between the brake pads 69 and braking action occurs. The vertical motion of the cable 43 occurs, of course, in response to actuation of the brake actuator 44 (FIG. 1) in the conventional manner. (Not shown in FIG. 3 is a conventional spring that, in the absence of braking action, separates the pads 69).

Referring to FIGS. 4–7 there is shown the power module coupling joint 29. Hinge pins 71 on the bar 32 mate with hinging hooks 72 of a coupling member 73. The hooks 72 and pins 71 permit the member 73 to flex with respect to the bar 32 as shown in FIG. 6. However, the blocking end section 74 of the tube 32 prevents flexure in the opposite direction. Furthermore, a screw 75 with a large knurled head 76 mates with a threaded opening in the member 73 and selectively prevents flexure of the joint 29 from the position shown in FIG. 4. It will be appreciated that beginning with the joint 29 in the configuration shown in FIG. 6, if the member 73 is moved to the right, the elements 73 and 32 will become completely separated. Conversely, if the member 73 rotates to the position shown in FIG. 4, and the screw 75 is tightened, the joint 29 is firmly fastened. Observation of FIG. 1 will make it plain that the strength of the screw 75 is not critical. That is because the weight of the bicycle 21 forces the joint 29 to flex against the blocking section 74. Consequently, it is blocking section 74 and the pins 71 that support the weight of the bicycle operator rather than the screw 75.

Assembly of the bicycle begins with the separate components shown in FIG. 2. The rear power module 22 and the operator control module 30 are coupled by placing the joint 29 in the configuration shown in FIG. 6. The parts are then moved so that the configuration shown in FIG. 4 is achieved and the screw 75 is tightened. The member 53 is then coupled to the clamp 37. Following that, the joint 41 is coupled. The blocks 56 and 57 are placed adjacent one another and the screws 58 are tightened. At this point, the collapsible bicycle 21 is assembled and ready for use. Collapsing entails just the reverse procedure. If desired, the luggage carrier 51 can be added. No adjustment of seat height, etc., is required after assembly inasmuch as the seat 35 and the handlebars 39 are both on the operator control module 30 so that no maladjustment is caused by collapsing the bicycle. Also, the front brake 42 is entirely on he operator control module 30 and thus it will not need adjustment after assembly. Likewise, the chain sprockets 26 and 27 and the chain 25 and the rear brake 28 are all on the rear power module 22 and thus do not need adjustment after assembly.

Figure 8:
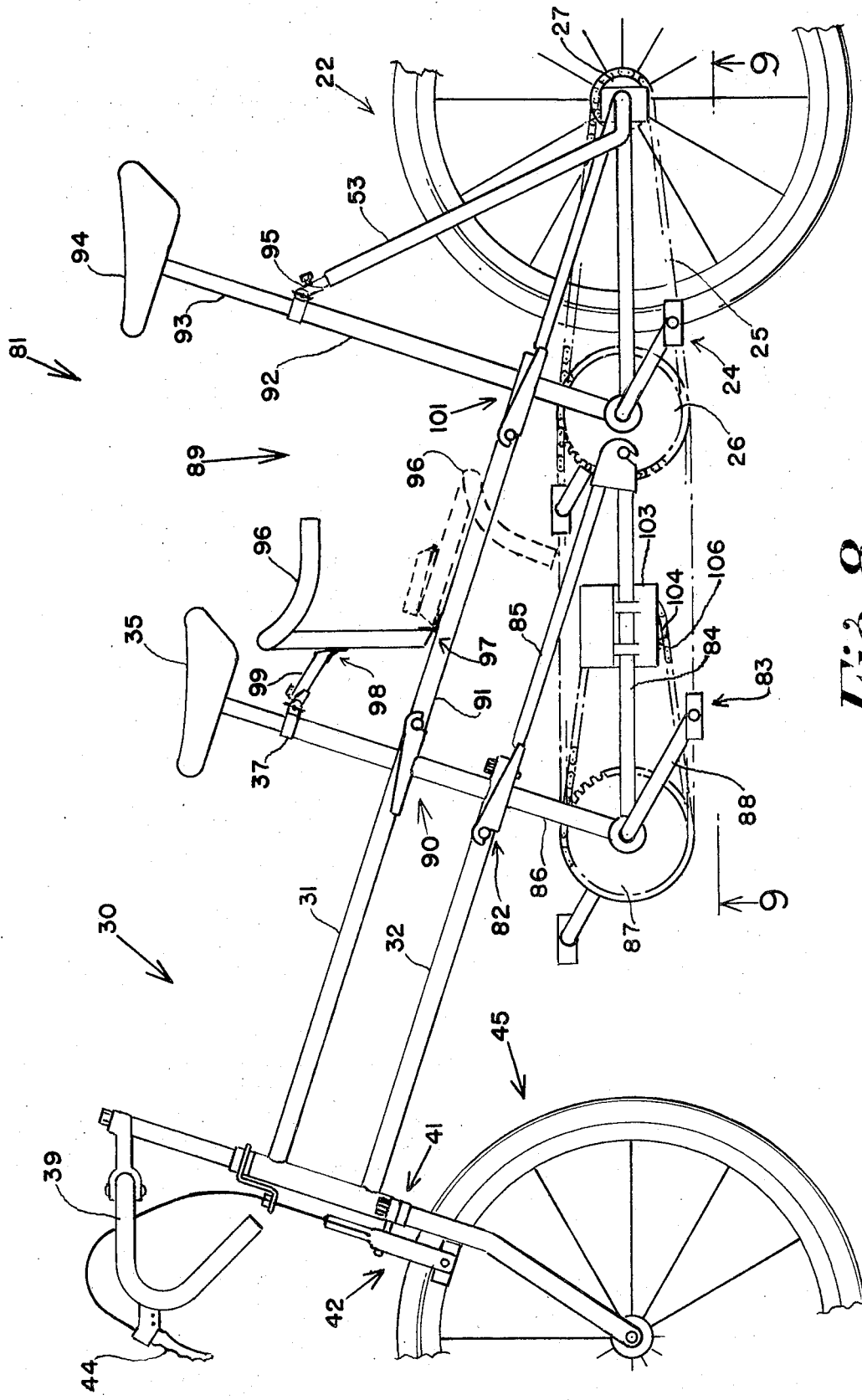
FIG. 8 is an elevation view of a collapsible tandem bicycle.

Referring now to FIG. 8 there is shown a tandem bicycle 81. The front portion of the bicycle 81 includes the operator control module 30 and the front wheel module 45 coupled precisely as in the bicycle 21. However, the end of the bar 32 that was coupled to the rear power module 22 is now coupled by a joint 82 (which is identical to the joint 29) to an auxiliary power module 83. The auxiliary power module 83 includes a generally triangular frame section comprising the bars 84, 85 and 86. The frame portion supports auxiliary pedals 88, an auxiliary sprocket 87 and a second sprocket 105 parallel to but hidden thereby. An auxiliary operator assist motor 103 is also mounted on the frame and coupled to a sprocket 87 by a sprocket 104 and a chain 106. The motor 103 is quite small in size as it is only designed to assist the operator and not to supply the total power needs of the vehicle 81. Moreover it should be understood that the motor 103 is optional with the embodiment 81. A single rider can use the embodiment 81 if he wishes to use the motor 103.

Coupled to the end of the bar 31 by a joint 90 is an auxiliary seat module 89 including a bar 91 and a pillar 92. Telescopically adjustable within the pillar 92 is a seat support bar 93 supporting an auxiliary seat 94. The height of the auxiliary seat 94 can be fixed by an adjustment clamp 95. Auxiliary handlebars 96 are coupled to the bar 91 by a hinge 97. Another hinge 98 couples a connecting rod 99 from the handlebars 96 to the clamp 37. When the bar 99 is released from the clamp 37 the handlebars 96 can fold to a storage position as shown in phantom in FIG. 8.

A joint 101 (identical to the joint 29) couples the rear power module 22 to the end of the bar 91. A sprocket 109 (FIG. 9) is parallel to but hidden behind the sprocket 26 as viewed in FIG. 8. The hidden sprocket 109 receives a power coupling chain 102 from the second sprocket 105. (The sprocket 109 was in the first embodiment 21, but was hidden there also). A better understanding of the configuration of the chains 25 and 102 will be obtained from the fragmentary FIG. 9.

During assembly of the tandem model 81, the joint 41 is assembled as described with respect to the embodiment 21. Next, the joint 90 is assembled to attach the auxiliary seat module 89. Following this, the auxiliary power module 83 is coupled by the joint 82. Lastly, the rear power module 22 is coupled by the joint 101 and by affixing the bar 53 to the clamp 95. It will be appreciated upon observation of FIGS. 8 and 9 that when the joint 101 is moved toward the position shown in FIG. 6, the sprockets 105 and 109 come closer together and the chain 102 can easily be mounted. Note that the chain 102 is placed on the outside sprockets 105 and 109. The chains 25 and 106 on the inside sprockets 26 and 87 are each contained entirely on a single module (modules 22 and 83 respectively) and thus remain permanently mounted. Removal and remounting of the chain 102 is facilitated by its positioning on the outside sprockets 105 and 109. Following the mounting of the chain 102, the joint 101 is moved to the position shown in FIG. 4 and the chain 102 is then in place. At this point the tandem bicycle 81 is assembled and ready for operation.

Obviously, many modifications and variations of the present invention are possible in light of the above teachings. It is to be understood, therefore, that the invention can be practiced otherwise than as specifically described.

What is claimed is:

1. A collapsible bicycle comprising:
   a rear power module including a rear wheel and pedal means coupled thereto;
   an operator control module comprising seat means and steering means;
   power module coupling means for detachably coupling said rear power module and said operator control module;
   a front wheel module comprising a front wheel and a fork means; and
   front wheel coupling means for detachably operatively coupling said fork means to said steering means.

2. A bicycle according to claim 1 wherein said rear wheel defines a preselected perimeter and said rear power module, said operator control module and said front wheel module define perimeters of substantially the same size as said preselected perimeter.

3. A bicycle according to claim 2 wherein said rear wheel and said front wheel are the same size.

4. A bicycle according to claim 1 wherein said rear power module comprises brake means.

5. A bicycle according to claim 4 wherein said brake means is a coaster brake.

6. A bicycle according to claim 1 wherein said operator control module comprises brake means and said front wheel coupling means detachably operatively couples said brake means to said front wheel.

7. A bicycle according to claim 1 wherein said steering means comprises handlebars.

8. A bicycle according to claim 1 wherein said rear power module comprises a stand movable between a luggage carrier position and a service stand position.

9. A bicycle according to claim 1 wherein said operator control module comprises adjustment means for adjusting the position of said seat means.

10. A bicycle according to claim 1 wherein said power module coupling means comprises hinge means.

11. A bicycle according to claim 1 comprising an auxiliary seat module with an auxiliary seat, said auxiliary seat module being adapted to be mounted between said operator control module and said rear power module so that an operator seated upon said auxiliary seat can operate said pedal means, and further comprising an auxiliary power module with auxiliary pedal means operable by an operator in said seat means and power coupling means for detachably coupling said auxiliary pedal means to said rear power module.

12. A bicycle according to claim 11 wherein said power coupling means comprises a chain.

13. A bicycle according to claim 12 wherein said pedal means comprises a sprocket and said auxiliary pedal means comprises an auxiliary sprocket and said sprockets are coupled by said chain, and wherein said auxiliary power module and said rear power module are coupled so that said sprockets can be moved closer together for installation of said chain and said sprockets can be spaced apart for operation.

14. A bicycle according to claim 13 wherein said auxiliary seat module comprises hinge pin means operable in conjunction with said power module coupling means for flexibly coupling said rear power module to said auxiliary seat module for providing the variable spacing between said sprockets and said auxiliary seat module further comprises blocking means for preventing flexing in a direction opposite a chosen flex direction.

15. A bicycle according to claim 13 wherein said pedal means comprises two parallel sprocket and said rear power module comprises frame means for mounting said pedal means and wherein said chain means is coupled to the one of said two parallel sprockets that is spaced the farthest from said frame means.

16. A bicycle according to claim 12 comprising auxiliary handlebars for use by an operator in said auxiliary seat.

17. A bicycle according to claim 16 wherein said auxiliary handlebars are mounted on said auxiliary seat module.

18. A bicycle according to claim 17 wherein said auxiliary seat module further comprises handlebar hinge means for facilitating the moving of said auxiliary handlebars between an operating position and a storage position.

19. A bicycle according to claim 18 wherein said auxiliary seat module comprises auxiliary adjustment means for adjusting the position of said auxiliary seat.

20. A bicycle according to claim 11 wherein said operator control module comprises brake means and said front wheel coupling means detachably operatively couples said brake means to said front wheel.

21. A bicycle according to claim 11 comprising a motor operatively coupled to said rear wheel for assisting the operator of said bicycle.

22. A bicycle according to claim 21 wherein said motor is mounted on said auxiliary power module.

* * * * *